US010968941B2

(12) United States Patent
Wang

(10) Patent No.: US 10,968,941 B2
(45) Date of Patent: Apr. 6, 2021

(54) FASTENING DEVICE

(71) Applicant: DTECH PRECISION INDUSTRIES CO., LTD., New Taipei (TW)

(72) Inventor: Ting-Jui Wang, New Taipei (TW)

(73) Assignee: DTECH PRECISION INDUSTRIES CO., LTD., New Taipei (TW)

( * ) Notice: Subject to any disclaimer, the term of this patent is extended or adjusted under 35 U.S.C. 154(b) by 310 days.

(21) Appl. No.: 16/056,732

(22) Filed: Aug. 7, 2018

(65) Prior Publication Data

US 2019/0048916 A1 Feb. 14, 2019

(30) Foreign Application Priority Data

Aug. 8, 2017 (TW) ................................ 106126802

(51) Int. Cl.

*F16B 35/04* (2006.01)
*F16B 2/22* (2006.01)
*F16B 21/20* (2006.01)
*F16B 37/04* (2006.01)
*F16B 21/08* (2006.01)

(52) U.S. Cl.

CPC ................ *F16B 35/04* (2013.01); *F16B 2/22* (2013.01); *F16B 21/086* (2013.01); *F16B 21/20* (2013.01); *F16B 37/043* (2013.01)

(58) Field of Classification Search

CPC .. F16B 2/22; F16B 5/02; F16B 5/0208; F16B 21/084; F16B 21/086; F16B 21/20; F16B 35/04; F16B 37/043

USPC ......................... 411/352, 353, 508, 509–510

See application file for complete search history.

(56) References Cited

U.S. PATENT DOCUMENTS 3,213,189 A * 10/1965 Mitchell .................. F16B 2/22 174/138 R
4,194,272 A * 3/1980 Taffurelli ................ A44B 1/34 24/114.7
4,772,152 A * 9/1988 Gill ..................... F16L 37/0985 403/289
7,179,037 B2 * 2/2007 Aukzemas ........... F16B 5/0208 411/107
2004/0003508 A1 * 1/2004 Wu ...................... F16B 5/0208 33/613
2010/0232908 A1 * 9/2010 Chiu ..................... F16B 5/0208 411/554

(Continued)

FOREIGN PATENT DOCUMENTS

CN 106194936 A 12/2016
CN 106763058 A 5/2017

(Continued)

*Primary Examiner* — Roberta S Delisle

(74) *Attorney, Agent, or Firm* — Schmeiser, Olsen & Watts, LLP

(57) ABSTRACT

A fastening device includes a head member and a body member. The head member has a stem portion provided with a fastening section; and the body member is movably assembled to the head member and includes an elastic fastening section for engaging with a first workpiece. To connect the first workpiece to a second workpiece, simply fasten the fastening section of the stem portion to the second workpiece. To disconnect the first workpiece from the second workpiece, simply release the fastening section from the second workpiece. With these arrangements, it is able to quickly connect and easily disconnect two workpieces to and from one another.

20 Claims, 14 Drawing Sheets

(56) References Cited

U.S. PATENT DOCUMENTS

| | | | | |
|---|---|---|---|---|
| 2011/0067219 | A1* | 3/2011 | Wang | F16B 5/0208<br>29/428 |
| 2012/0251265 | A1* | 10/2012 | Chiu | F16B 5/0208<br>411/349 |
| 2014/0093326 | A1* | 4/2014 | Wang | F16B 5/0208<br>411/103 |

FOREIGN PATENT DOCUMENTS

| | | | |
|---|---|---|---|
| TW | 201111656 | A | 4/2011 |
| TW | M403572 | U | 5/2011 |
| TW | M493611 | U | 1/2015 |
| TW | M517264 | U | 2/2016 |

* cited by examiner

FASTENING DEVICE

CROSS-REFERENCE TO RELATED APPLICATION

This non-provisional application claims priority under 35 U.S.C. § 119(a) on Patent Application No(s). 106126802 filed in Taiwan, R.O.C. on Aug. 8, 2017, the entire contents of which are hereby incorporated by reference.

FIELD OF THE INVENTION

The present invention relates to a fastening device, and more particularly, to a fastening device for fastening at least two workpieces to one another, such that the workpieces can be quickly connected and easily disconnected to and from one another.

BACKGROUND OF THE INVENTION

When connecting two workpieces to one another, the two workpieces are usually fastened together using screws or locking elements, so that they are firmly and fixedly held together without the risk of being easily separated or released from each other.

However, while the two objects fastened or locked together using the above conventional fixing manner are not easily separated or released from each other, it is possible the two fixedly connected objects could not be easily assembled to another workpiece. Also, the two workpieces fixedly connected together using screws could not be conveniently disconnected from each other when necessary.

It is therefore tried by the inventor to effectively overcome the drawbacks of the prior art fasteners by developing a fastening device that enables quick connection and easy disconnection of two workpieces to and from one another.

SUMMARY OF THE INVENTION

A primary object of the present invention is to overcome the drawbacks of the prior art fastening devices by developing a fastening device that enables quick connection and easy disconnection of two workpieces to and from one another.

To achieve the above and other objects, the fastening device according to an embodiment of the present invention includes a head member having a stem portion provided with a fastening section and a body member movably assembled to the head member and including an elastic fastening section for engaging with a first workpiece.

According to another embodiment of the present invention, the fastening device includes a head member and a body member. The head member has a stem portion provided with a fastening section, the body member includes an elastic fastening section for engaging with a first workpiece, and the body member and the head member are structurally abutted against each other to thereby assemble together while being movable relative to each other within a limited range.

In the fastening device according to either of the above embodiments, the head member includes a first abutting section and the body member includes a second abutting section; and the second abutting section are abutted against one of the first abutting section, the stem portion and the fastening section of the stem portion, so that the head member and the head member are movably assembled together.

In the fastening device according to either of the above embodiments, the head member and the stem portion can be assembled to each other or be integrally formed with each other.

In the fastening device according to either of the above embodiments, the elastic fastening section can be located at a lower end, a lateral side or an upper end of the body member.

In the fastening device according to either of the above embodiments, the elastic fastening section can include at least one elastic retaining protrusion. The elastic fastening section or the elastic retaining protrusion is elastically backwardly compressible and deformable when being extended from a first side of the first workpiece through a retaining hole formed on the first workpiece, and is elastically restorable to an original shape after passing through the retaining hole to thereby abut against an opposite side of the first workpiece, bringing the fastening device to engage with the first workpiece.

In the fastening device according to either of the above embodiments, the fastening device is engaged with the first workpiece with the fastening section of the stem portion being fastened to a second workpiece.

In the fastening device according to either of the above embodiments, the first abutting section of the head member can be an elastic section, which is elastically deformable to abut against the second abutting section of the body member, so that the head member and the body member are movably assembled to one another; or the second abutting section of the body member can be an elastic section, which is elastically deformable to abut against the first abutting section of the head member, so that the head member and the body member are movably assembled to one another.

In the fastening device according to either of the above embodiments, the body member is provided with a female thread and the fastening section is an externally threaded section for meshing with the female thread, such that the fastening section can be screwed to the body member for the first abutting section to abut against the second abutting section.

In the fastening device according to either of the above embodiments, the elastic fastening section can include one or more than one elastic retaining protrusion.

In the fastening device according to either of the above embodiments, the elastic retaining protrusion can be in the form of a barb, an outward and upward extension, a hook, an enclosed strip, a circular protrusion, a plurality of mutually connected hooks, a size-expanded body, a size-reduced body, a curved body, a cambered body or a flat body.

In the fastening device according to either of the above embodiments, the body member can include a stop section for abutting on one side of the first workpiece.

In the fastening device according to either of the above embodiments, the first workpiece is restrictively located between the elastic fastening section and the stop section.

In the fastening device according to either of the above embodiments, the stop section can be an elastic pressing member for pressing against one side of the first workpiece, such that the first workpiece is elastically pressed by between the stop section and the elastic fastening section.

In the fastening device according to either of the above embodiments, the fastening section can be an externally threaded section, a column, a male retaining body or a female retaining body.

In either of the above embodiments, the fastening device further includes an elastic element. The elastic element has an end pressed against the head member and another end pressed against one of the body member, the stem portion and the fastening section of the stem portion.

In the fastening device according to either of the above embodiments, the head member and the stem portion can be assembled to one another by way of riveting, expansion connection, screw-fastening, pin-connection, snap-on fastening, movable interference fit or welding, or can be integrally formed with one another by, for example, plastic insert molding.

In the fastening device according to either of the above embodiments, the head member and the stem portion can be assembled to each other via pin-connection using a pin.

In the fastening device according to either of the above embodiments, the body member is formed using a mold through an in-mold injection molding process. The mold internally includes a molding zone configured corresponding to the body member as well as one or more feed runners communicable with the molding zone. To manufacture the body member, first guide a molten material through the feed runners into the molding zone in the mold. Then, allow the molten material to cool and harden in the molding zone to form the body member.

In the fastening device according to either of the above embodiments, the body member can be made of a plastic material, a rubber material, a silicone rubber material, an acrylic material or a metal material.

In the fastening device according to either of the above embodiments, the body member can be provided with at least one locating section for locating the body member in place on the first workpiece when engaging the elastic fastening section with the first workpiece; and the first workpiece can be provided with at least one locating hole corresponding to the at least one locating section.

In the fastening device according to either of the above embodiments, the first workpiece is provided with at least one retaining hole or at least one through hole corresponding to the elastic fastening section, the fastening section or the locating section.

In the fastening device according to either of the above embodiments, the elastic fastening section is engaged with a retaining hole or a through hole provided on the first workpiece.

In the fastening device according to either of the above embodiments, the fastening section is extended through the through hole on the first workpiece to fasten to a second workpiece.

In either of the above embodiments, a plurality of the fastening devices can be positioned in a carrier.

In the fastening device according to either of the above embodiments, the carrier is closable with a cover.

In either of the above embodiments, the fastening device and the first workpiece are connected to each other to form a module before the fastening device is further fastened to a second workpiece.

In the fastening device according to either of the above embodiments, the second abutting section of the body member can include an abutting element for abutting against the stem portion or the fastening section.

In the fastening device according to either of the above embodiments, the stem portion or the fastening section is entirely or partially received in the body member.

In the fastening device according to either of the above embodiments, one of the first and the second abutting section can be an elastic section for elastically abutting against the other one of the first and the second abutting section.

In the fastening device according to either of the above embodiments, the first and the second abutting section can respectively include a guiding surface to reduce a mutual interference force between the first and the second abutting section when the head member is elastically assembled to the body member.

In the fastening device according to either of the above embodiments, the first and the second abutting section can respectively include an abutting surface for producing between the elastically assembled head member and body member an anti-separation interference force that is stronger than a retaining force that can be produced between the guiding surfaces.

With these arrangements, the elastic fastening section of the fastening device of the present invention can be first engaged with a first workpiece and the fastening section of the stem portion can be then fastened to a second workpiece to quickly connect the first workpiece to the second workpiece. On the other hand, when the fastening section is released from the second workpiece, the first workpiece can be easily disconnected from the second workpiece. Therefore, the fastening device of the present invention enables quick connection and easily disconnection of two workpieces to and from one another.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
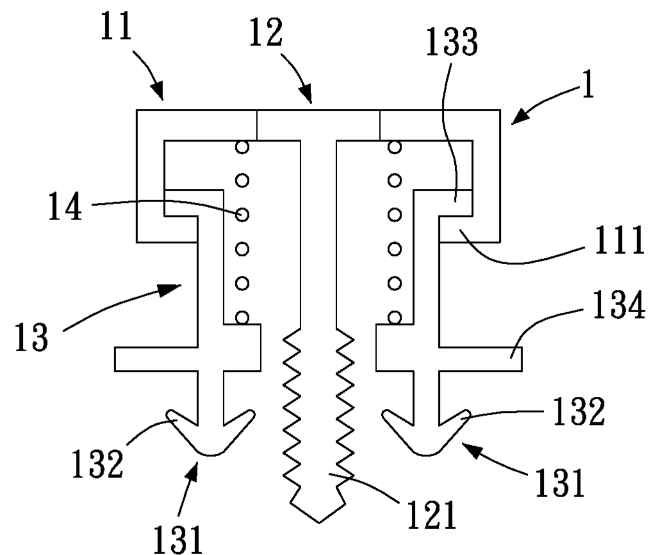
FIG. 1 is a sectional view of a fastening device according to a first embodiment of the present invention.
Figure 2:
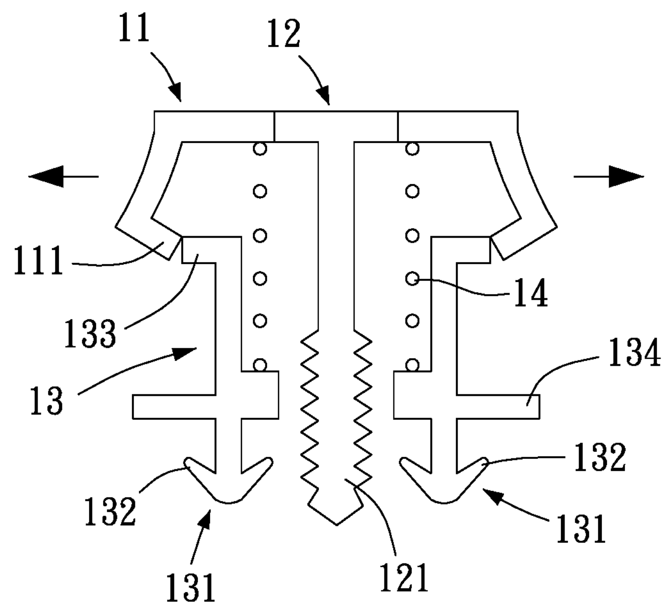
FIG. 2 shows the mounting of the fastening device of FIG. 1 to a first workpiece.
Figure 3:
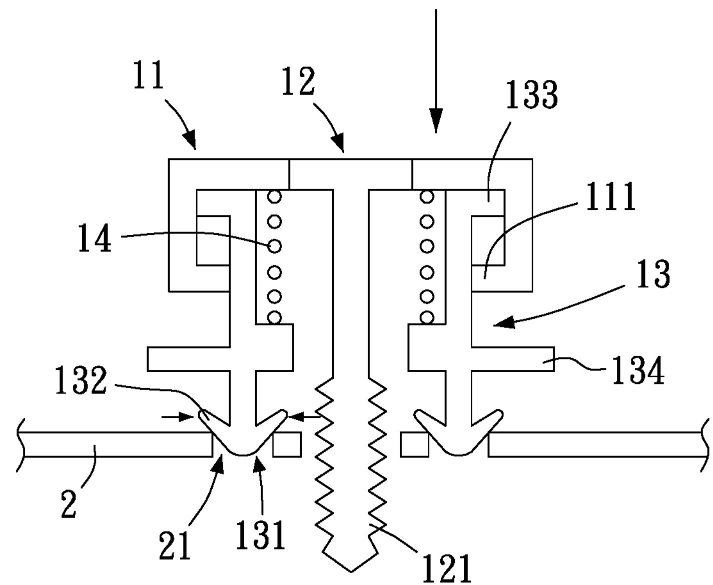
FIG. 3 shows the mounting of the fastening device of FIG. 1 to a first workpiece.
Figure 4:
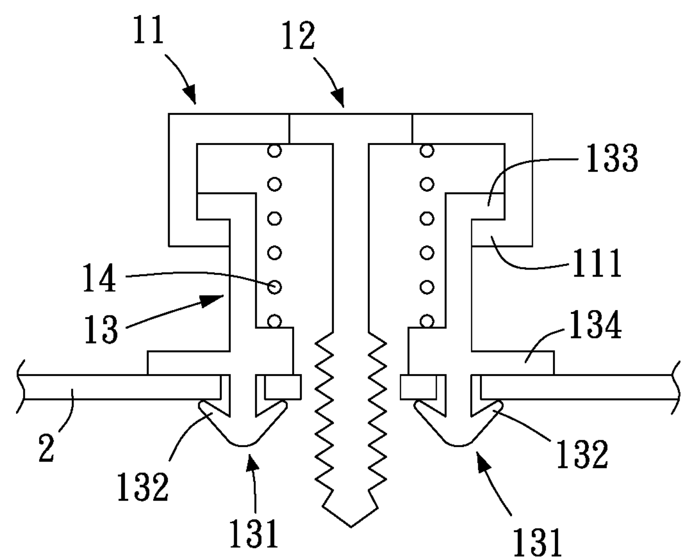
FIG. 4 shows the mounting of the fastening device of FIG. 1 to a first workpiece.

The present invention will now be described with some preferred embodiments thereof and by referring to the accompanying drawings.

Please refer to FIGS. 1 to 4. A fastening device 1 according to a first embodiment of the present invention includes at least a head member 11 and a body member 13, which are structurally abutted against each other to thereby assemble together while being movable relative to each other within a limited range.

The head member 11 is formed on around a lower end with a first abutting section 111, which is an elastic fastening section. The head member 11 also has a stem portion 12 associated therewith. The stem portion 12 includes a fastening section 121, which can be differently shaped. In the first embodiment, the fastening section 121 is illustrated as an externally threaded section.

The body member 13 includes an elastic fastening section 131, which can be located at a lower end, a lateral side or an upper end of the body member 13. In the first embodiment, the elastic fastening section 131 is illustrated as being located at the lower end of the body member 13. The elastic fastening section 131 includes at least one elastic retaining protrusion 132, which can be differently shaped. In the first embodiment, the elastic retaining protrusion 132 is in the form of a barb. However, the elastic retaining protrusion 132 can be otherwise in the form of a size-expanded body, a size-reduced body, a curved body, a cambered body or a flat body. The body member 13 further includes a second abutting section 133 located around an end thereof; and a stop section 134 located around an outer wall surface of the body member 13.

The fastening device 1 also includes an elastic element 14, which is located in between the heat member 11 and the body member 13 with two ends separately pressed against the two members.

The fastening device 1 is formed by movably connecting the body member 13 to the head member 11. When the body member 13 is being assembled to the head member 11, the elastic first abutting section 111 of the head member 11 is forced by the body member 13 to deform and expand, allowing the second abutting section 133 of the body member 13 to move into the head member 11 to finally abut against an inner side of the first abutting section 111 when the latter elastically returns to its original shape. In this manner, the head member 11 and the body member 13 are movably assembled together. Before the body member 13 is assembled to the head member 11, or before the head member 11 and the stem portion 12 are assembled together, the elastic element 14 is first fitted around the stem portion 12, such that the elastic element 14 has one end pressed against the heat member 11 and the other end against the body member 13 and the stem portion 12 or the fastening section 121 is entirely or partially received in the body member 13 when the body member 13 and the head member 11 have been movably assembled together.

The head member 11 and the stem portion 12 can be assembled to each other by way of riveting, expansion connection, screw-fastening, pin-connection, snap-on fastening, movable interference fit or welding; or be integrally formed with each other by, for example, plastic insert molding.

To use the fastening devices 1, first engage the elastic fastening section 131 of the body member 13 of each of the fastening devices 1 with a first workpiece 2. To do this, the elastic fastening section 131 or the elastic retaining protrusion 132 thereof is extended from a first side, usually a top side, of the first workpiece 2 through a retaining hole 21 formed thereon to an opposite second side, usually a bottom side, of the first workpiece 2. At this point, the elastic fastening section 131 or the elastic retaining protrusion 132 will be backwardly compressed and elastically deformed. After passing through the retaining hole 21, the elastic fastening section 131 or the elastic retaining protrusion 132 elastically restores to its original shape to abut against the second side of the first workpiece 2. At this point, the stop section 134 of the body member 13 is abutted on the first side of the first workpiece 2, so that the latter is restrictively located between the elastic fastening section 131 and the stop section 134. At this point, the fastening device 1 and the first workpiece 2 are connected to each other to form a module.

To use the fastening device 1 to connect the first workpiece 2 to a second workpiece (not shown), first turn the head member 11 of the fastening device 1 to extend or screw the fastening section 121 of the stem portion 12 into the second workpiece. At this point, the elastic element 14 is elastically compressed between the head member 11 and the body member 13. To disconnect the first workpiece 2 from the second workpiece, simply apply an external force to turn the head member 11 of the fastening device 1 reversely and disengage the fastening section 121 of the stem portion 12 from the second workpiece. At this point, the elastic element 14 is elastically released to push the first workpiece 1 away from the second workpiece. In this manner, the fastening device 1 enables two workpieces to be quickly connected and easily disconnected to and from one another.

Figure 5:
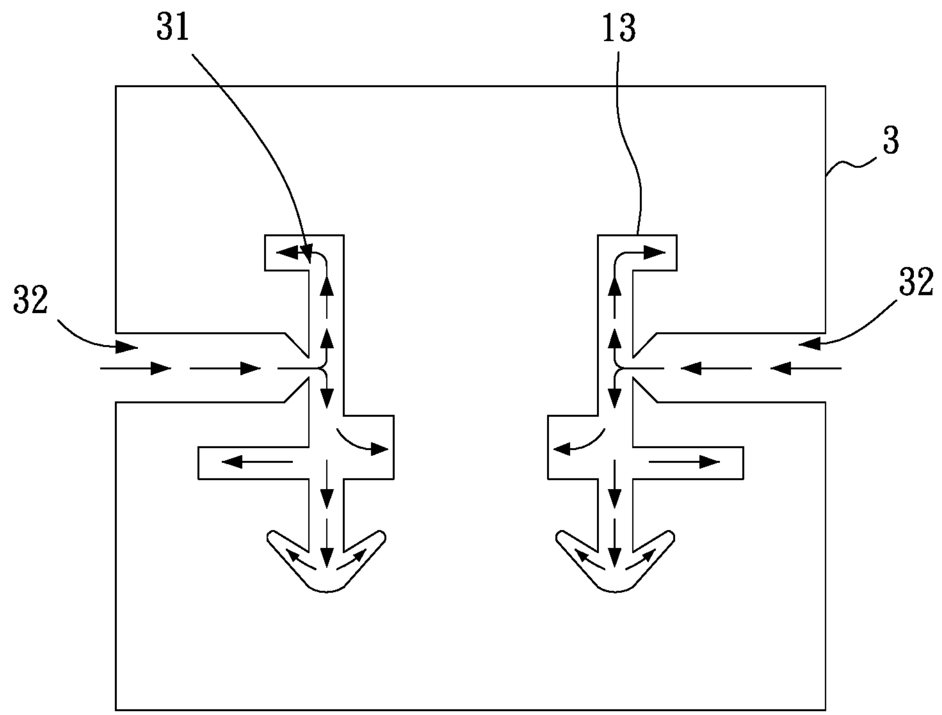
FIG. 5 shows the forming of a body member of the fastening device of FIG. 1.

Please refer to FIG. 5 that shows the forming of the body member 13 of the fastening device 1 according to the first embodiment of the present invention. As shown, the body member 13 is formed using a mold 3 through an in-mold injection molding process. The mold 3 internally includes a molding zone 31 configured corresponding to the body member 13 as well as one or more feed runners 32 communicable with the molding zone 31. To manufacture the body member 13, first guide a molten material through the feed runners 32 into the molding zone 31 in the mold 3. Then, allow the molten material to cool and harden in the molding zone 31 to form the body member 13. The body member 13 can be made of a plastic material, a rubber material, a silicone rubber material, an acrylic material or a metal material.

Figure 6:
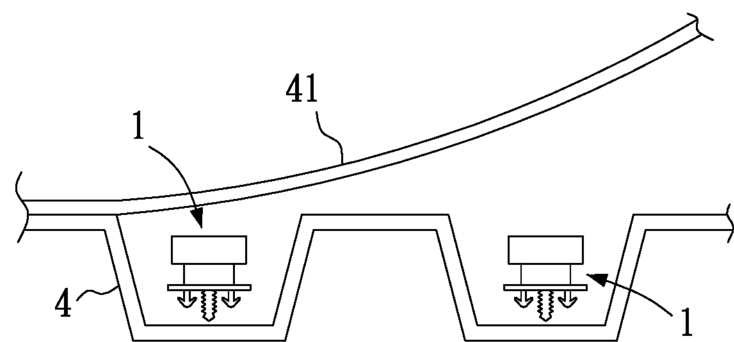
FIG. 6 shows the manner of storing and organizing a plurality of the fastening devices according to the present invention.

Please refer to FIG. 6 that shows the manner of storing and organizing a plurality of the fastening devices 1 according to the present invention. As shown, a plurality of the fastening devices 1 can be positioned in a carrier 4, which is closable with a cover 41. Therefore, the fastening devices 1 are disposed in the carrier 4 in an organized manner to facilitate safe storage and transport thereof.

Figure 7:
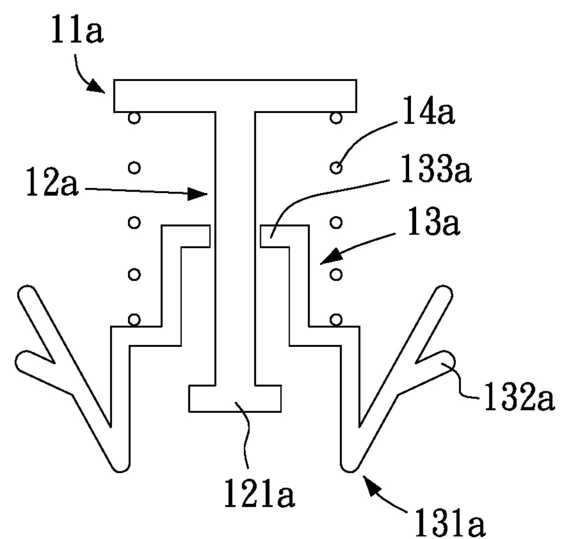
FIG. 7 is a sectional view of a fastening device according to a second embodiment of the present invention.
Figure 8:
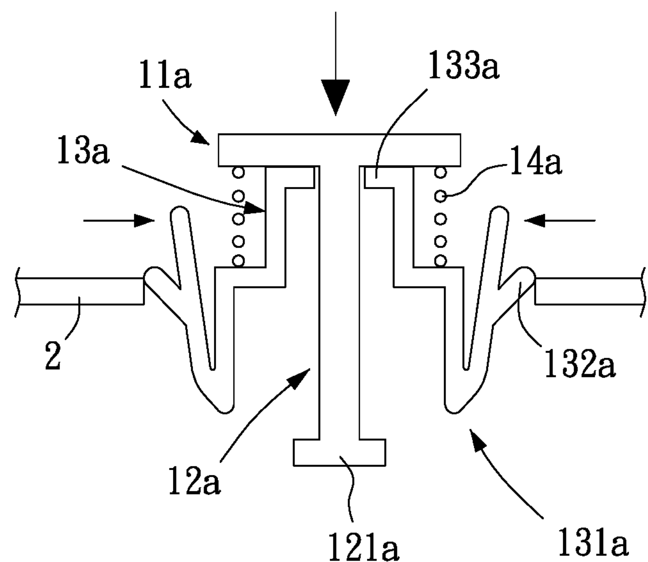
FIG. 8 is a sectional view of a fastening device according to a second embodiment of the present invention.
Figure 9:
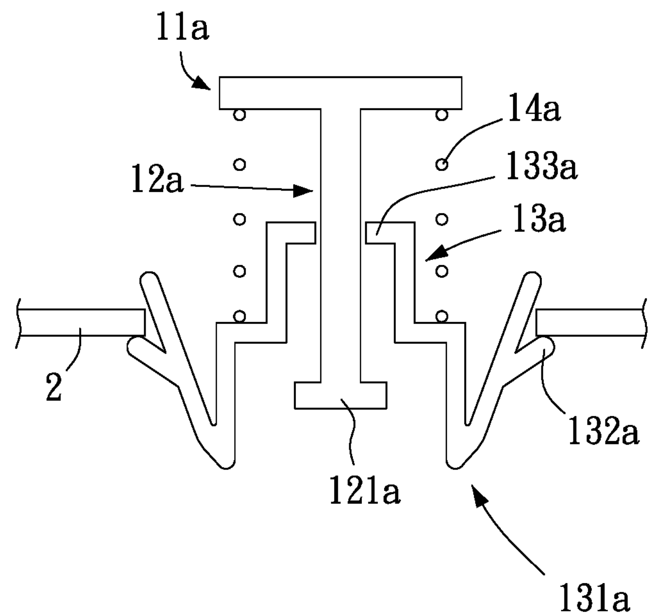
FIG. 9 is a sectional view of a fastening device according to a second embodiment of the present invention.

Please refer to FIGS. 7 to 9, in which a fastening device according to a second embodiment of the present invention is shown. For the purpose of easy to understand, elements in the second embodiment that are the same as those in the first embodiment are denoted by the same reference numerals but with a suffix "a". In the second embodiment, the second abutting section 133*a* is abutted against the stem portion 12*a*, so that the body member 13*a* is movably assembled to the head member 11*a*. And, in the second embodiment, the fastening section 121*a* of the stem portion 12*a* is in the form of a male retaining body with a flat front end, the elastic fastening section 131*a* is in the form of an enclosed strip with the elastic retaining protrusion 132*a* outward and upward extended therefrom, and the elastic element 14*a* is pressed at two ends against the head member 11*a* and the body member 13*a*. With these arrangements, the elastic fastening section 131*a* and the elastic retaining protrusion 132*a* in the fastening device according to the second embodiment can also work together to engage with the first workpiece 2.

Figure 10:
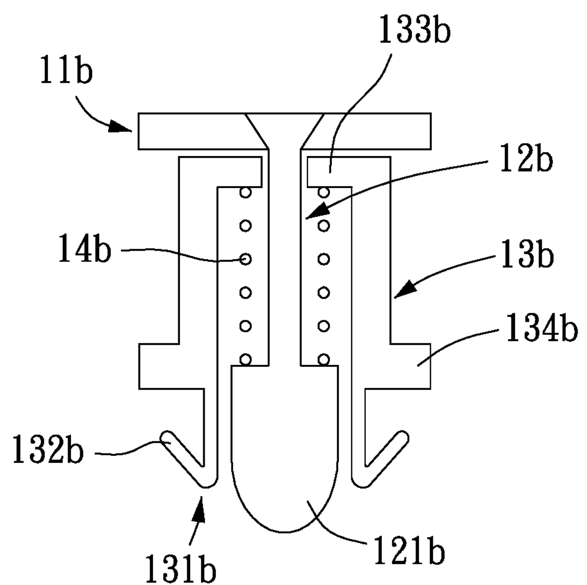
FIG. 10 is a sectional view of a fastening device according to a third embodiment of the present invention.
Figure 11:
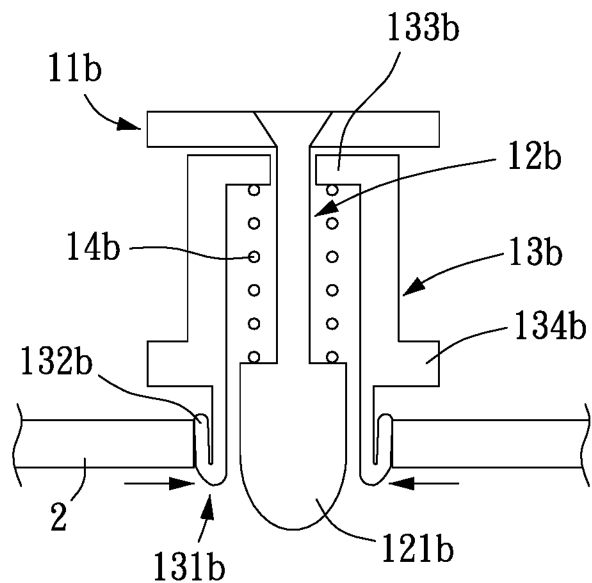
FIG. 11 is a sectional view of a fastening device according to a third embodiment of the present invention.
Figure 12:
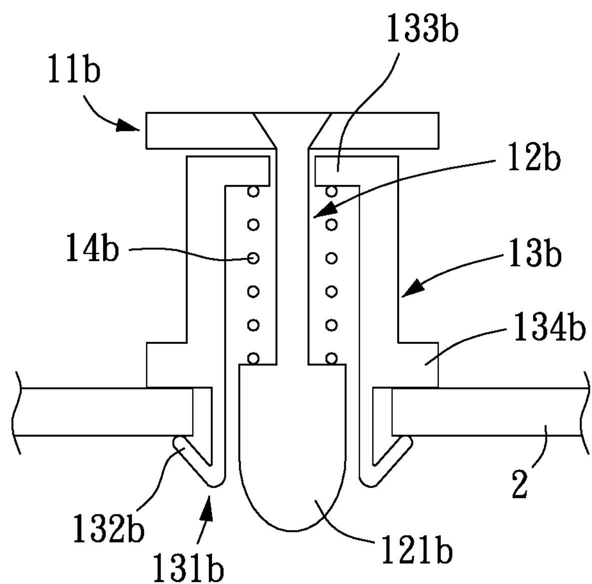
FIG. 12 is a sectional view of a fastening device according to a third embodiment of the present invention.

Please refer to FIGS. 10 to 12, in which a fastening device according to a third embodiment of the present invention is shown. For the purpose of easy to understand, elements in the third embodiment that are the same as those in the first embodiment are denoted by the same reference numerals but with a suffix "b". In the third embodiment, the second abutting section 133*b* is abutted on the head member 11*b*, so that the body member 13*b* is movably assembled to the head member 11*b*. In the third embodiment, the fastening section 121*b* of the stem portion 12*b* is in the form of a column, the elastic retaining protrusion 132*b* of the elastic fastening section 131*b* is in the form of a circular protrusion, and the elastic element 14*b* is pressed at two ends against the body member 13*b* and the fastening section 121*b* of the stem portion 12*b*. With these arrangements, the elastic fastening section 131*b* and the elastic retaining protrusion 132*b* in the fastening device according to the third embodiment can also work together to engage with the first workpiece 2 while the latter is retained between elastic retaining protrusion 132*b* of the elastic fastening section 131*b* and the stop section 134*b*.

Figure 13:
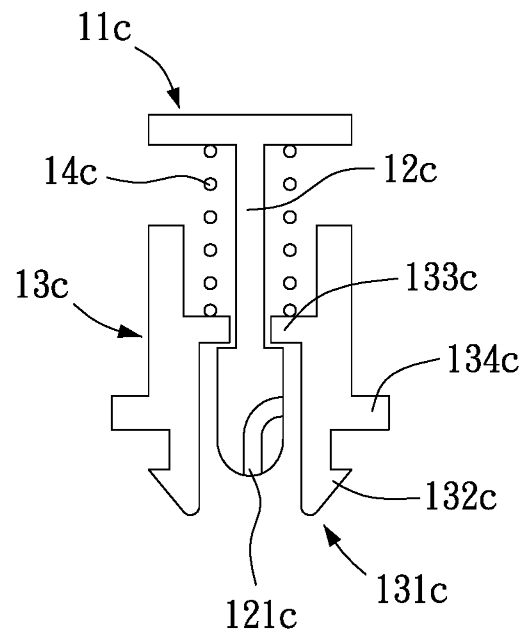
FIG. 13 is a sectional view of a fastening device according to a fourth embodiment of the present invention.
Figure 14:
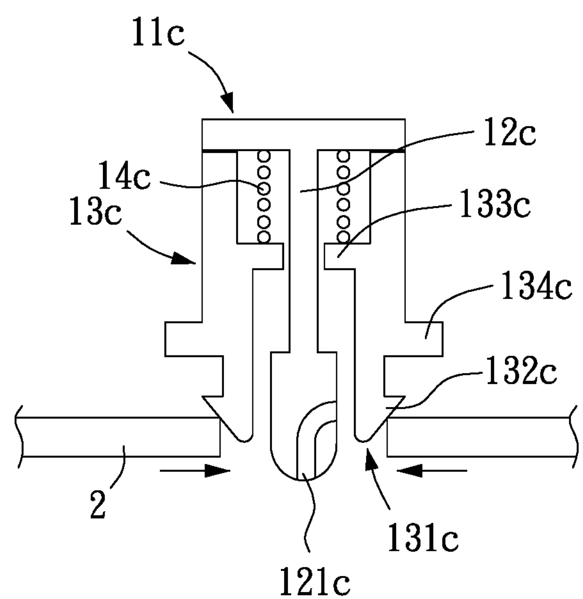
FIG. 14 is a sectional view of a fastening device according to a fourth embodiment of the present invention.
Figure 15:
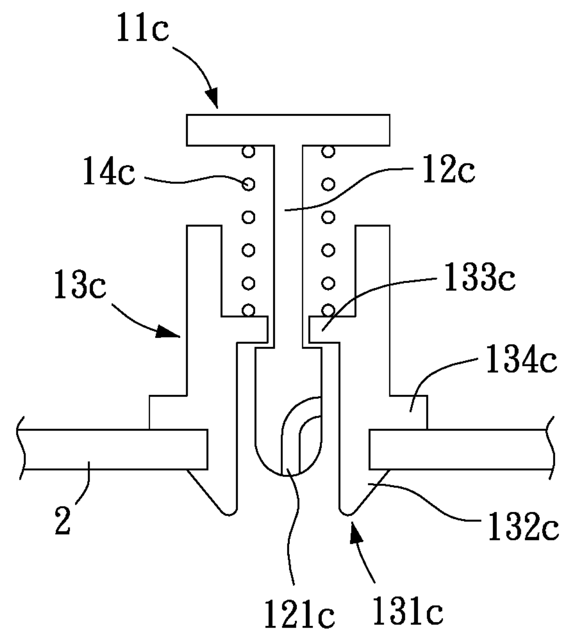
FIG. 15 is a sectional view of a fastening device according to a fourth embodiment of the present invention.

Please refer to FIGS. 13 to 15, in which a fastening device according to a fourth embodiment of the present invention is shown. For the purpose of easy to understand, elements in the fourth embodiment that are the same as those in the first embodiment are denoted by the same reference numerals but with a suffix "c". In the fourth embodiment, the second abutting section 133*c* is abutted against the fastening section 121*c* of the stem portion 12*c*, so that the body member 13*c* is movably assembled to the head member 11*c*. In the fourth embodiment, the fastening section 121*c* of the stem portion 12*c* is in the form of a female retaining body, the elastic retaining protrusion 132*c* of the elastic fastening section 131*c* is in the form of a hook, and the elastic element 14*c* is pressed at two ends against the body member 13*c* and the head member 11*c*. With these arrangements, the elastic fastening section 131*c* and the elastic retaining protrusion 132*c* in the fastening device according to the fourth embodiment can also work together to engage with the first workpiece 2 while the latter is retained between elastic retaining protrusion 132*c* of the elastic fastening section 131*c* and the stop section 134*c*.

Figure 16:
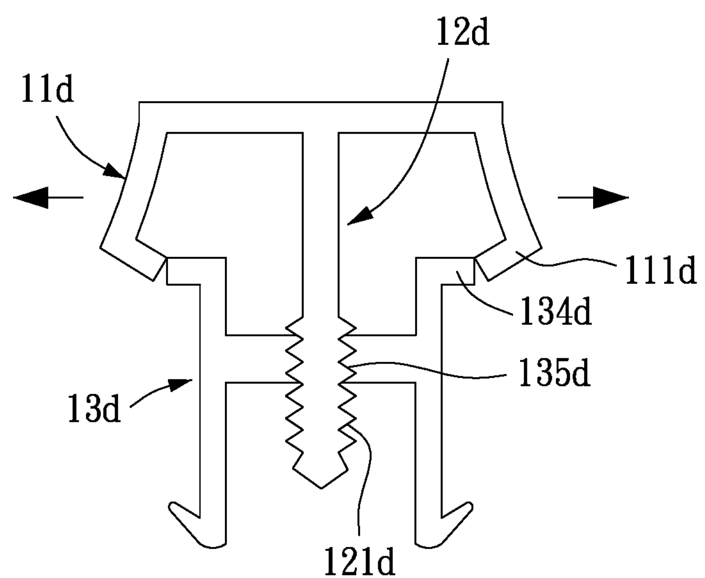
FIG. 16 is a sectional view of a fastening device according to a fifth embodiment of the present invention.
Figure 17:
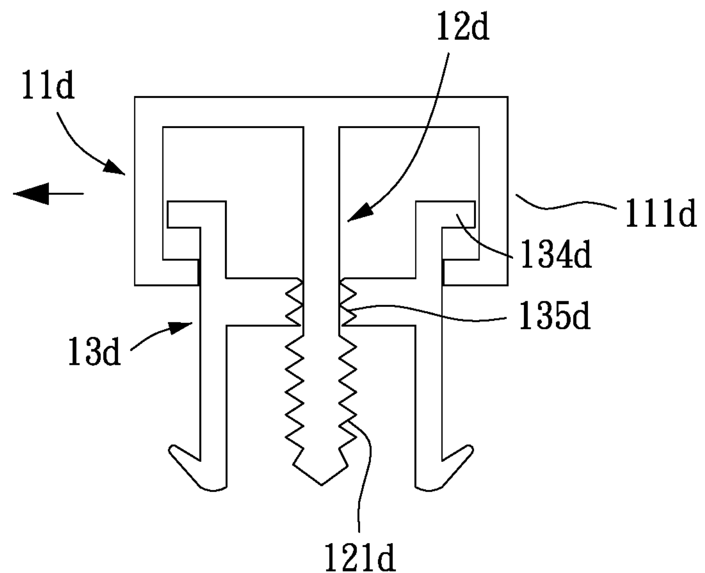
FIG. 17 is a sectional view of a fastening device according to a fifth embodiment of the present invention.

Please refer to FIGS. 16 and 17, in which a fastening device according to a fifth embodiment of the present invention is shown. For the purpose of easy to understand, elements in the fifth embodiment that are the same as those in the first embodiment are denoted by the same reference numerals but with a suffix "d". In the fifth embodiment, the body member 13*d* is provided with a female thread 135*d* and the fastening section 121*d* is an externally threaded section, i.e., provided with a male thread. When assembling the head member 11*d* to the body member 13*d*, simply apply a force to turn the head member 11*d*, so that the stem portion 12*d* is brought to turn at the same time to engage the externally threaded fastening section 121*d* with the female thread 135*d* of the body member 13*d*. At this point, the first abutting section 111*d* is caused to abut against the second abutting section 133*d*, so that the head member 11*d* is movably assembled to the body member 13*d*.

Figure 18:
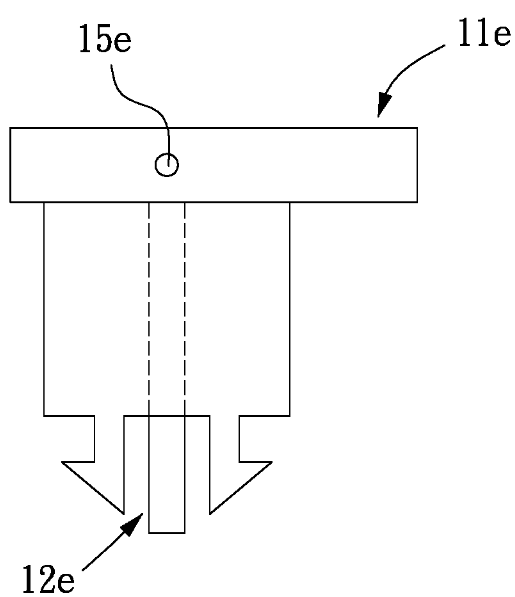
FIG. 18 is a schematic view of a fastening device according to a sixth embodiment of the present invention.

Please refer to FIG. 18, in which a fastening device according to a sixth embodiment of the present invention is shown. For the purpose of easy to understand, elements in the sixth embodiment that are the same as those in the first embodiment are denoted by the same reference numerals but with a suffix "e". In the sixth embodiment, the head member 11*e* and the stem portion 12*e* are assembled to each other via pin-connection using a pin 15*e*.

Figure 19:
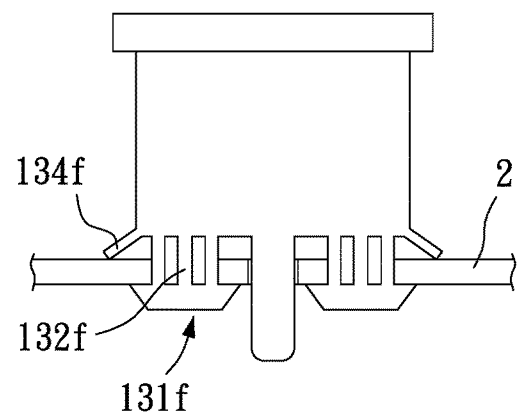
FIG. 19 is a schematic view of a fastening device according to a seventh embodiment of the present invention.

Please refer to FIG. 19, in which a fastening device according to a seventh embodiment of the present invention is shown. For the purpose of easy to understand, elements in the seventh embodiment that are the same as those in the first embodiment are denoted by the same reference numerals but with a suffix "f". In the seventh embodiment, the elastic retaining protrusion 132*f* of the elastic fastening section 131*f* includes a plurality of mutually connected hooks, and the stop section 134*f* is an elastic pressing member. When the elastic fastening section 131*f* is engaged with the first workpiece 2, the first workpiece 2 is elastically pressed by between the stop section 134*f* and the elastic fastening section 131*f*.

Figure 20:
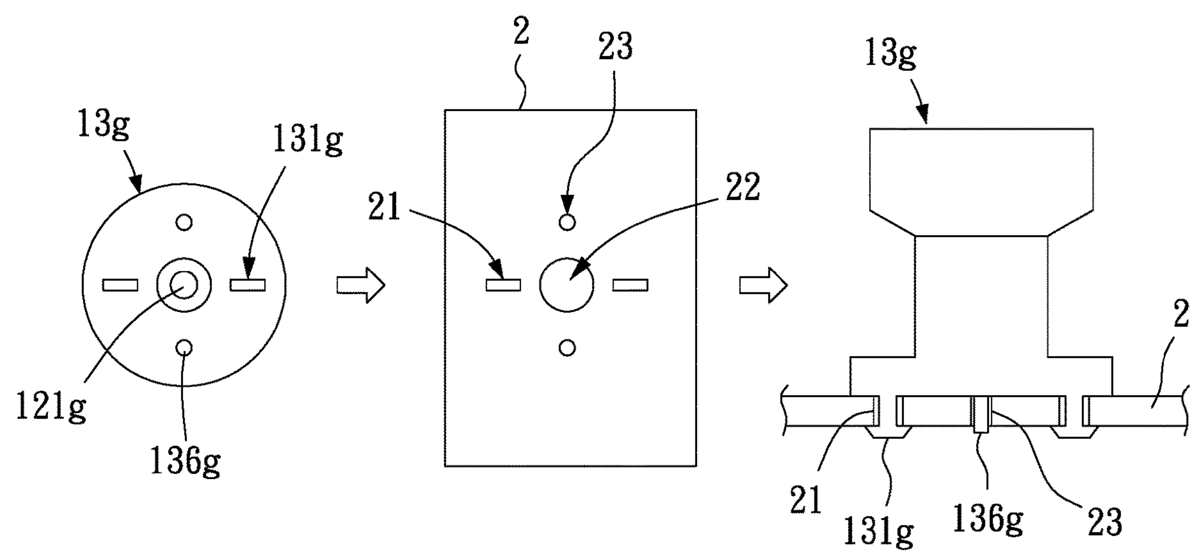
FIG. 20 is a schematic view of a fastening device according to an eighth embodiment of the present invention.

Please refer to FIG. 20, in which a fastening device according to an eighth embodiment of the present invention is shown. For the purpose of easy to understand, elements in the eighth embodiment that are the same as those in the first embodiment are denoted by the same reference numerals but with a suffix "g". In the eighth embodiment, the body member 13*g* includes at least one locating section 136*g*, and the first workpiece 2 is provided with at least one retaining hole 21, at least one through hole 22 and at least one locating hole 23 corresponding to the elastic fastening section 131*g*, the fastening section 121*g* and the locating section 136*g*, respectively. To engage the elastic fastening section 131*g* of the body member 13*g* with the first workpiece 2, first align and engage the at least one locating section 136*g* with the at least one locating hole 23 to locate the body member 13*g* in place on the first workpiece 2. Then, extend the fastening section 121*g* through the through hole 22 to fasten it to a second workpiece (not shown).

Figure 21:
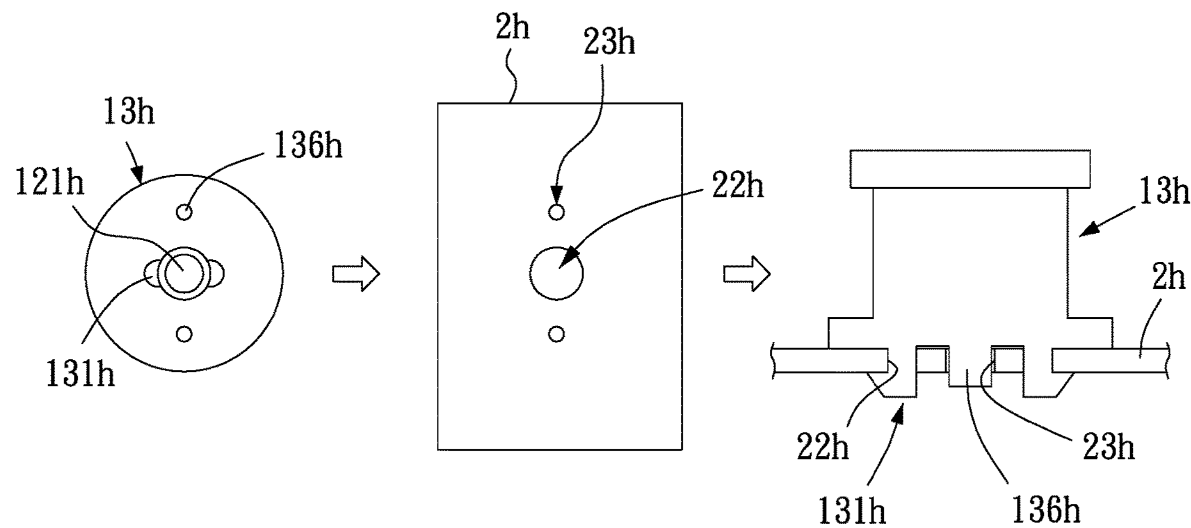
FIG. 21 is a schematic view of a fastening device according to a ninth embodiment of the present invention.

Please refer to FIG. 21, in which a fastening device according to a ninth embodiment of the present invention is shown. For the purpose of easy to understand, elements in the ninth embodiment that are the same as those in the first embodiment are denoted by the same reference numerals but with a suffix "h". In the ninth embodiment, the body member 13*h* includes at least one locating section 136*h*, the elastic fastening section 131*h* is arranged in the vicinity of the fastening section 121*h*, and the first workpiece 2*h* is provided with a through hole 22*h* corresponding to the elastic fastening section 131*h* and the fastening section 121*h* as well as at least one locating hole 23*h* corresponding to the at least one locating section 136*h*. To engage the elastic fastening section 131*h* with the first workpiece 2*h*, first align and engage the at least one locating section 136*h* with the at least one locating hole 23*h* to locate the body member 13*h* in place on the first workpiece 2*h*, allowing the elastic fastening section 131*h* to engage with the through hole 22*h* of the first workpiece 2*h*. Then, extend the fastening section 121*h* through the through hole 22 to fasten it to a second workpiece (not shown).

Figure 22:
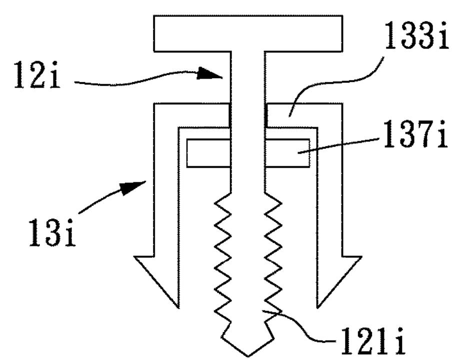
FIG. 22 is a sectional view of a fastening device according to a tenth embodiment of the present invention.

Please refer to FIG. 22, in which a fastening device according to a tenth embodiment of the present invention is shown. For the purpose of easy to understand, elements in the tenth embodiment that are the same as those in the first embodiment are denoted by the same reference numerals but with a suffix "i". In the tenth embodiment, the second abutting section 133*i* of the body member 13*i* is provided with an abutting element 137*i*, which is abutted against the stem portion 12*i* or the fastening section 121*i*.

Figure 23:
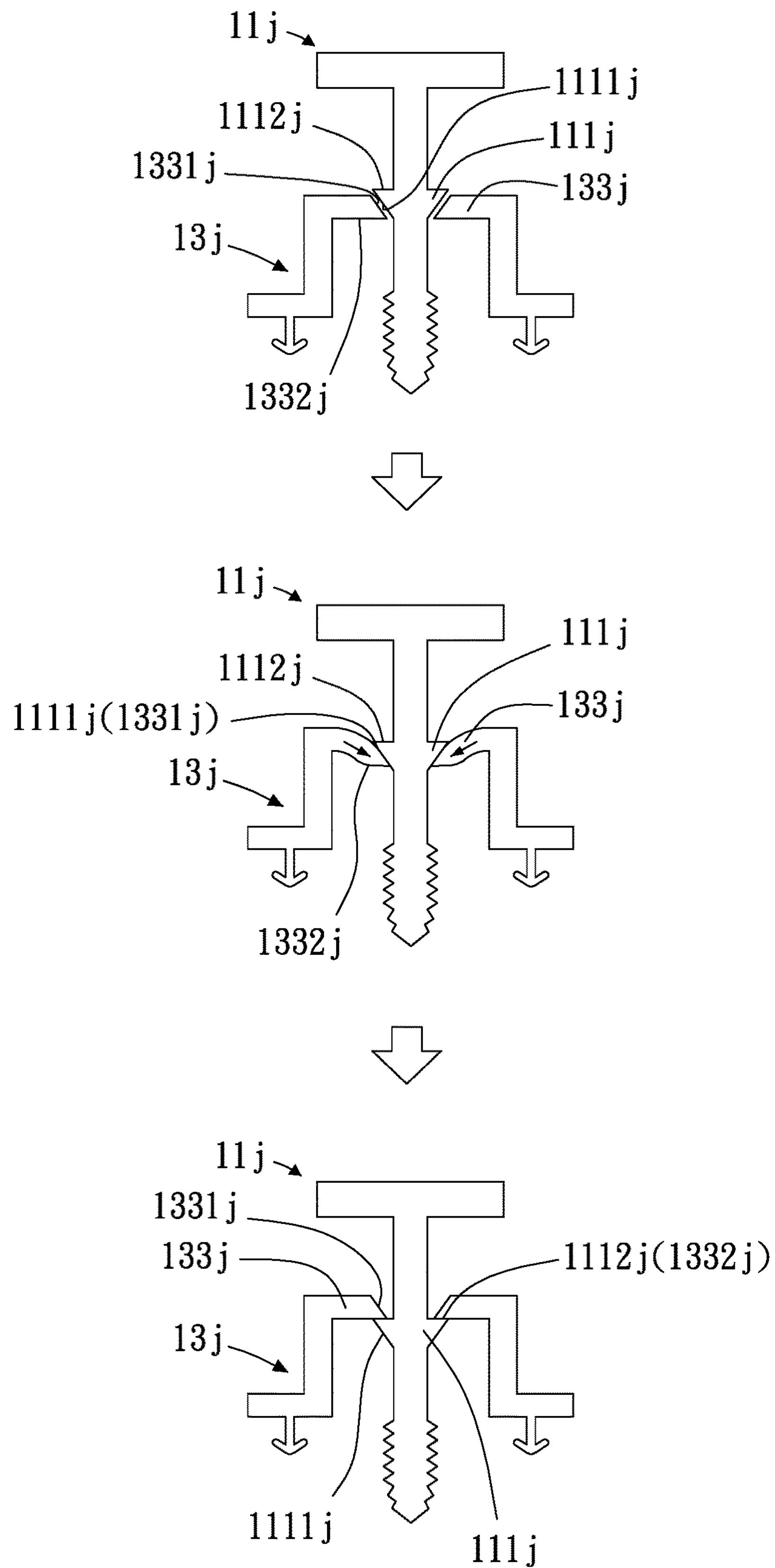
FIG. 23 is a sectional view of a fastening device according to an eleventh embodiment of the present invention.

Please refer to FIG. 23, in which a fastening device according to an eleventh embodiment of the present invention is shown. For the purpose of easy to understand, elements in the eleventh embodiment that are the same as those in the first embodiment are denoted by the same reference numerals but with a suffix "j". In the eleventh embodiment, the second abutting section 133*j* of the body member 13*j* and the first abutting section 111*j* of the head member 11*j* are elastic sections to enable elastic assembling and fastening of the body member 13*j* to the head member 11*j*. The first abutting section 111*j* and the second abutting section 133*j* have a first guiding surface 1111*j* and a second guiding surface 1331*j*, respectively. The first and the second guiding surface 1111*j*, 1331*j* reduce a mutual interference force between the first and the second abutting section 111*j*, 133*j* when the head member 11*j* is elastically assembled to the body member 13*j*. The first and the second abutting section 111*j*, 133*j* further include a first abutting surface 1112*j* and a second abutting surface 1332*j*, respectively. The first and the second abutting surface 1112*j*, 1332*j* produce between the elastically assembled head member 11*j* and body member 13*j* an anti-separation interference force that is stronger than a retaining force that can be produced between the first and the second guiding surface 1111*j*, 1331*j*.

Figure 24:
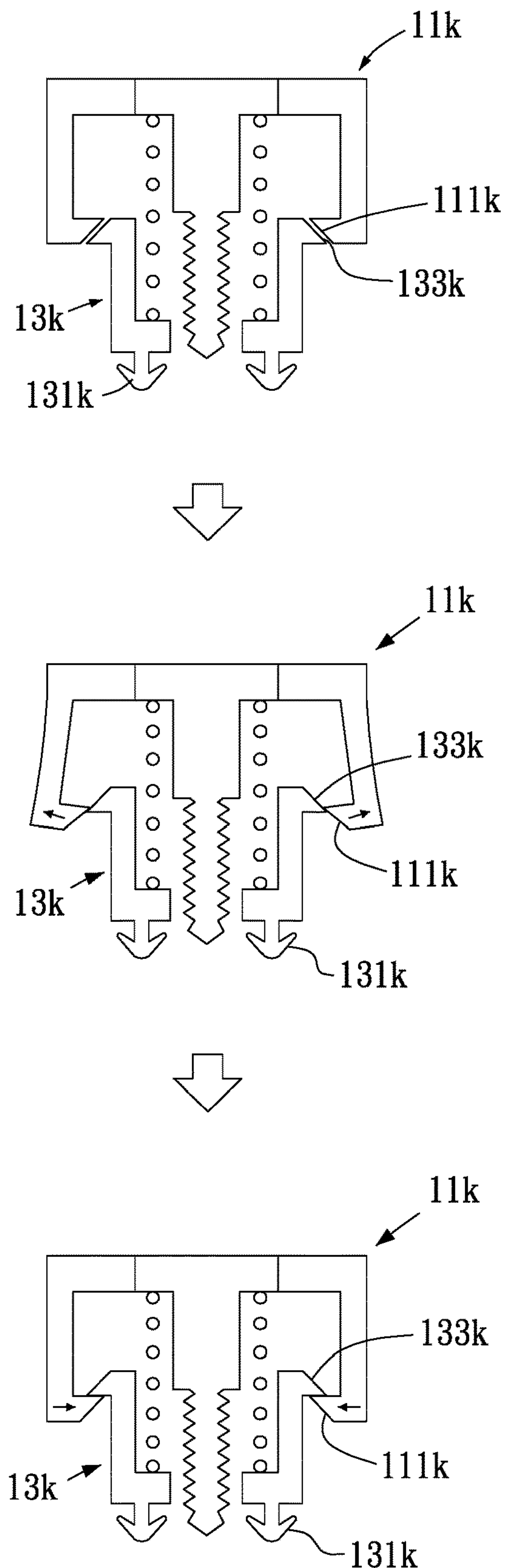
FIG. 24 is a sectional view of a fastening device according to a twelfth embodiment of the present invention.
Figure 25:
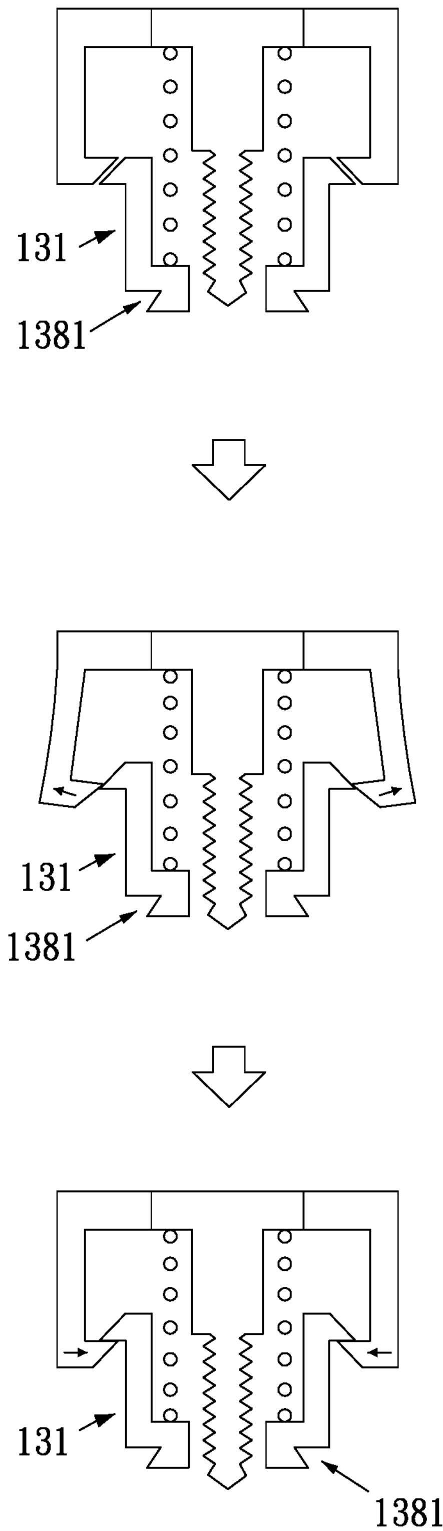
FIG. 25 is a sectional view of a fastening device according to a thirteenth embodiment of the present invention.

Please refer to FIGS. 24 and 25, in which two fastening devices according to a twelfth and a thirteenth embodiment, respectively, of the present invention are shown. For the purpose of easy to understand, some elements in both of the twelfth and the thirteenth embodiment that are the same as those in the first embodiment are denoted by the same reference numerals but with a suffix "k", while the body member in the thirteenth embodiment is denoted by a reference numeral 13*l*. In each of the twelfth and the thirteenth embodiment, the first abutting section 111*k* of the head member 11*k* is an elastic section, which is elastically deformable in order to abut against the second abutting section 133*k* of the body member 13*k*; or alternatively, the second abutting section 133*k* of the body member 13*l* is an elastic section, which is elastically deformable in order to abut against the first abutting section 111*k* of the head member 11*k*, so that the head member 11*k* and the body member 13*l* are movably assembled to one another.

In the twelfth embodiment shown in FIG. 24, the body member 13*k* includes an elastic fastening section 131*k*. However, in the thirteenth embodiment shown in FIG. 25, the body member 13*l* includes a material retaining section 138*l*. With the material retaining section 138*l*, a part of the material of the first workpiece 2 can be forced into and retained in the material retaining section 138*l* when the body member 13*l* is engaged with the first workpiece 2, so as to ensure firm connection of the body member 13*l* to the first workpiece 2.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

What is claimed is:

1. A fastening device, comprising:

a head member having a stem portion, and the stem portion having a fastening section; and a body member being movably assembled to the head member and including an elastic fastening section for engaging with a first workpiece;

wherein the elastic fastening section includes at least one elastic retaining protrusion; the elastic fastening section or the elastic retaining protrusion being elastically backwardly compressible and deformable when being extended from a first side of the first workpiece through a retaining hole formed on the first workpiece, and being elastically restorable to an original shape after passing through the retaining hole to thereby abut against an opposite side of the first workpiece, bringing the fastening device to engage with the first workpiece.

2. The fastening device as claimed in claim 1, wherein the head member includes a first abutting section and the body member includes a second abutting section; and the second abutting section being abutted against one of the first abutting section, the stem portion and the fastening section of the stem portion, so that the head member and the body member are movably assembled together.

3. The fastening device as claimed in claim 2, wherein the first abutting section of the head member is an elastic section, which is elastically deformable to abut against the second abutting section of the body member, so that the head member and the body member are movably assembled to one another; or wherein the second abutting section of the body member is an elastic section, which is elastically deformable to abut against the first abutting section of the head member, so that the head member and the body member are movably assembled to one another.

4. The fastening device as claimed in claim 3, wherein the body member is provided with a female thread and the fastening section is an externally threaded section for meshing with the female thread, such that the fastening section can be screwed to the body member for the first abutting section to abut against the second abutting section.

5. The fastening device as claimed in claim 2, wherein the second abutting section of the body member includes an abutting element for abutting against one of the stem portion and the fastening section.

6. The fastening device as claimed in claim 2, wherein one of the first and the second abutting section is an elastic section for elastically abutting against the other one of the first and the second abutting section; the first and the second abutting section respectively including a guiding surface to reduce a mutual interference force between the first and the second abutting section when the head member is elastically assembled to the body member; and the first and the second abutting section respectively including an abutting surface for producing between the elastically assembled head member and body member an anti-separation interference force that is stronger than a retaining force that can be produced between the guiding surfaces.

7. The fastening device as claimed in claim 1, wherein the body member includes a stop section for abutting on one side of the first workpiece.

8. The fastening device as claimed in claim 7, wherein the first workpiece is restrictively located between the elastic fastening section and the stop section; and the stop section being an elastic pressing member pressed against one side of the first workpiece, such that the first workpiece is elastically pressed by between the stop section and the elastic fastening section.

9. The fastening device as claimed in claim 1, further comprising an elastic element; and the elastic element having an end pressed against the head member and another end pressed against one of the body member, the stem portion and the fastening section of the stem portion.

10. The fastening device as claimed in claim 1, wherein the body member is provided with at least one locating section for locating the body member in place on the first workpiece when engaging the elastic fastening section with the first workpiece; and the first workpiece being provided with at least one locating hole corresponding to the at least one locating section.

11. A fastening device, comprising a head member and a body member; the head member having a stem portion provided with a fastening section, the body member including an elastic fastening section for engaging with a first workpiece, and the body member and the head member being structurally abutted against each other to thereby assemble together while being movable relative to each other within a limited range;

wherein the elastic fastening section includes at least one elastic retaining protrusion; the elastic fastening section or the elastic retaining protrusion being elastically backwardly compressible and deformable when being extended from a first side of the first workpiece through a retaining hole formed on the first workpiece, and being elastically restorable to an original shape after passing through the retaining hole to thereby abut against an opposite side of the first workpiece, bringing the fastening device to engage with the first workpiece.

12. The fastening device as claimed in claim 11, wherein the head member includes a first abutting section and the body member includes a second abutting section; and the second abutting section being abutted against one of the first abutting section, the stem portion and the fastening section of the stem portion, so that the head member and the body member are movably assembled together.

13. The fastening device as claimed in claim 12, wherein the first abutting section of the head member is an elastic section, which is elastically deformable to abut against the second abutting section of the body member, so that the head member and the body member are movably assembled to one another; or wherein the second abutting section of the body member is an elastic section, which is elastically deformable to abut against the first abutting section of the head member, so that the head member and the body member are movably assembled to one another.

14. The fastening device as claimed in claim 13, wherein the body member is provided with a female thread and the fastening section is an externally threaded section for meshing with the female thread, such that the fastening section can be screwed to the body member for the first abutting section to abut against the second abutting section.

15. The fastening device as claimed in claim 12, wherein the second abutting section of the body member includes an abutting element for abutting against one of the stem portion and the fastening section.

16. The fastening device as claimed in claim 12, wherein one of the first and the second abutting section is an elastic section for elastically abutting against the other one of the first and the second abutting section; the first and the second abutting section respectively including a guiding surface to reduce a mutual interference force between the first and the second abutting section when the head member is elastically assembled to the body member; and the first and the second abutting section respectively including an abutting surface for producing between the elastically assembled head member and body member an anti-separation interference force that is stronger than a retaining force that can be produced between the guiding surfaces.

17. The fastening device as claimed in claim 11, wherein the body member includes a stop section for abutting on one side of the first workpiece.

18. The fastening device as claimed in claim 17, wherein the first workpiece is restrictively located between the elastic fastening section and the stop section; and the stop section being an elastic pressing member pressed against one side of the first workpiece, such that the first workpiece is elastically pressed by between the stop section and the elastic fastening section.

19. The fastening device as claimed in claim 11, further comprising an elastic element; and the elastic element having an end pressed against the head member and another end pressed against one of the body member, the stem portion and the fastening section of the stem portion.

20. The fastening device as claimed in claim 11, wherein the body member is provided with at least one locating section for locating the body member in place on the first workpiece when engaging the elastic fastening section with the first workpiece; and the first workpiece being provided with at least one locating hole corresponding to the at least one locating section.

* * * * *